United States Patent [19]
Gates

[11] Patent Number: 4,990,946
[45] Date of Patent: Feb. 5, 1991

[54] VIEWFINDER

[75] Inventor: Richard A. Gates, Hilton, N.Y.

[73] Assignee: Eastman Kodak Company, Rochester, N.Y.

[21] Appl. No.: 492,003

[22] Filed: Mar. 12, 1990

[51] Int. Cl.⁵ .............................................. G03B 13/10
[52] U.S. Cl. .................................................... 354/222
[58] Field of Search ................................. 354/222, 199

[56] References Cited
U.S. PATENT DOCUMENTS
4,768,048  8/1988  Wakabayashi ................ 354/222 X
4,887,109 12/1989  Fujita et al. ........................ 354/222

Primary Examiner—Brian W. Brown
Attorney, Agent, or Firm—Roger A. Fields

[57] ABSTRACT

A plurality of pivotally mounted lens frames are positioned by cam means and gear means to produce normal, tele, and pan viewing.

5 Claims, 6 Drawing Sheets

VIEWFINDER

CROSS-REFERENCE TO RELATED APPLICATIONS

Reference is made to the following commonly assigned corresponding applications:

(1) U.S. Ser. No. 255,187, entitled CAMERA VIEW FINDER, filed Oct. 7, 1988, in the names of Richard A. Gates and Jeffrey R. Stoneham, U.S. Pat. No. 4,933,694.

(2) U.S. Ser. No. 372,233, entitled CAMERA VIEW FINDER, filed June 26, 1989, in the name of Richard A. Gates, U.S. Pat. No. 4,931,818.

BACKGROUND OF THE INVENTION

Field of the Invention

The present invention relates to viewfinders for use in cameras and more particularly to an improved viewfinder including a plurality of lenses adapted to be selectively positioned in a viewing position.

The commonly assigned applications cross-referenced above disclose mechanisms for selectively positioning at least three lenses into an optical path to provide at least three levels of magnification to produce special effects such as pseudo tele and pseudo pan. The mechanisms disclosed employ pivotal or rectilinearly movable lens frames positioned by a cam means to achieve selective positioning of the lenses.

SUMMARY OF THE INVENTION

In accordance with the present invention, a cam means and gear means are utilized in combination to selectively effect positioning of at least four lens frames to selectively achieve normal, panoramic, and tele viewing.

BRIEF DESCRIPTION OF THE DRAWINGS

The following description is taken in connection with the accompanying drawings wherein:

FIGS. 4 and 5 are views similar to FIGS. 1 and 2 showing the parts in a panoramic viewing position.

DETAILED DESCRIPTION OF THE PREFERRED EMBODIMENT

Figure 1:
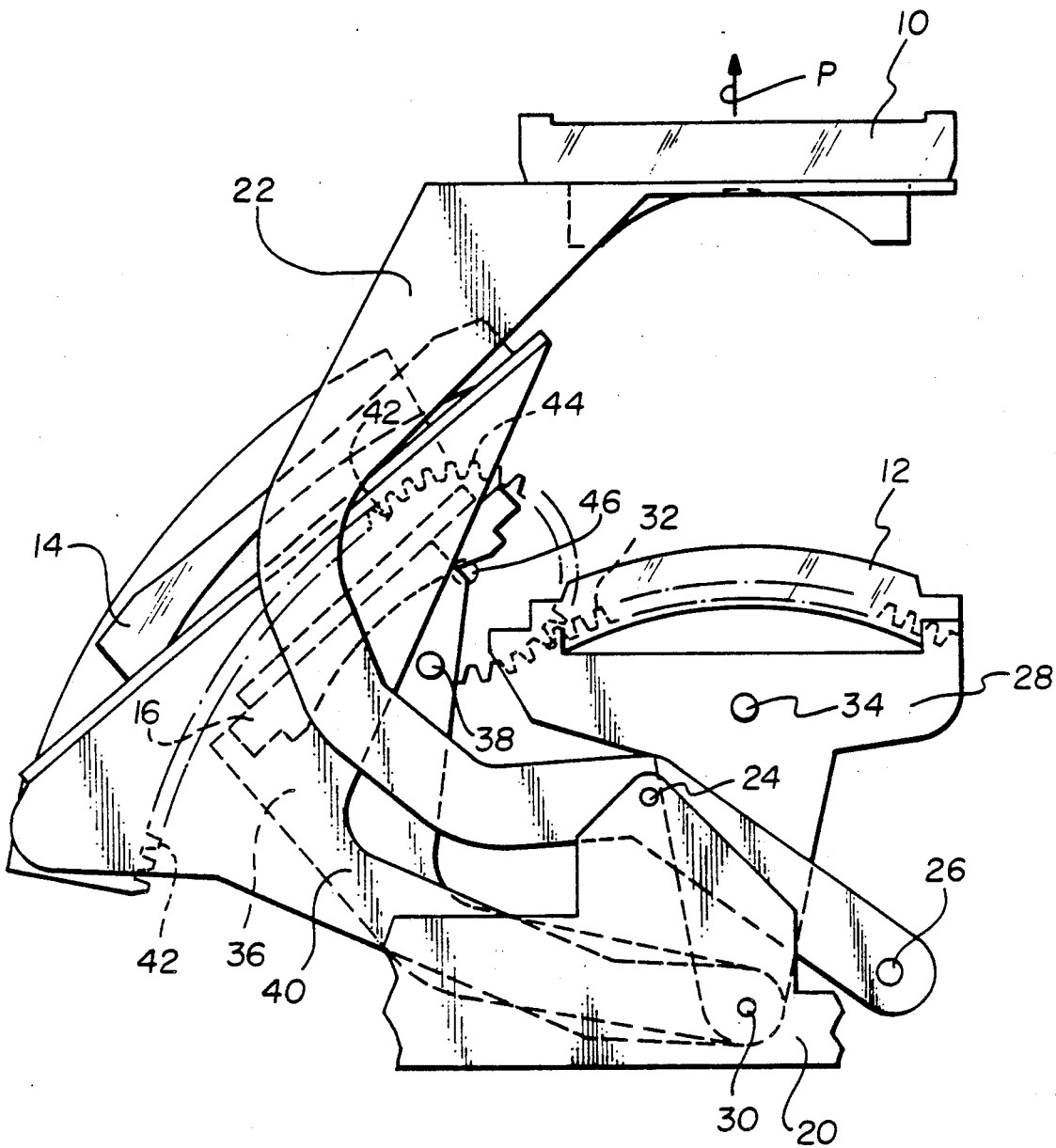
FIG. 1 is a top view of a viewfinder in accordance with the invention showing the parts in a normal viewing position.
Figure 2:
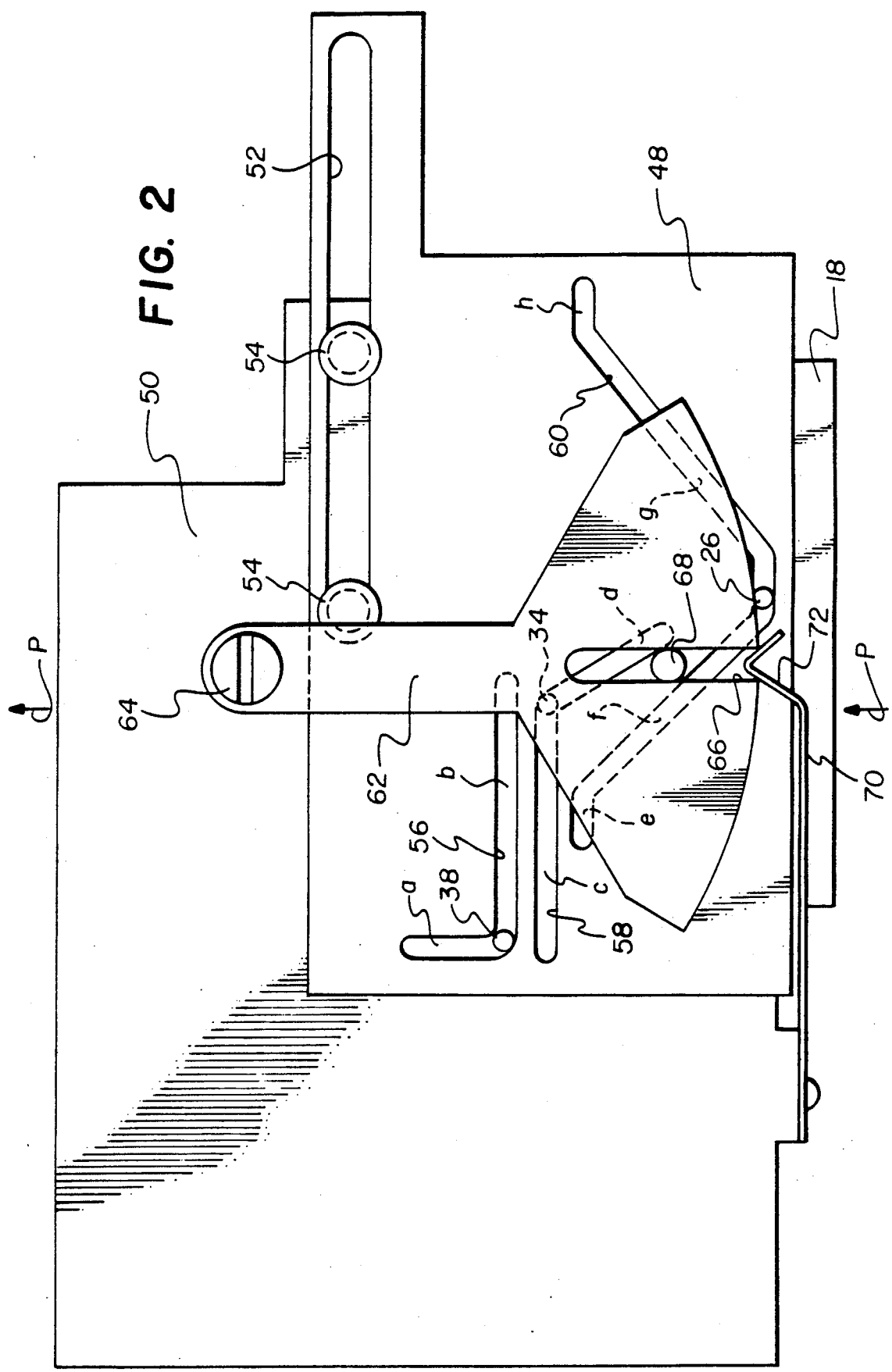
FIG. 2 is a top view similar to FIG. 1 with the cam plate removed to show other parts.
Figure 3:
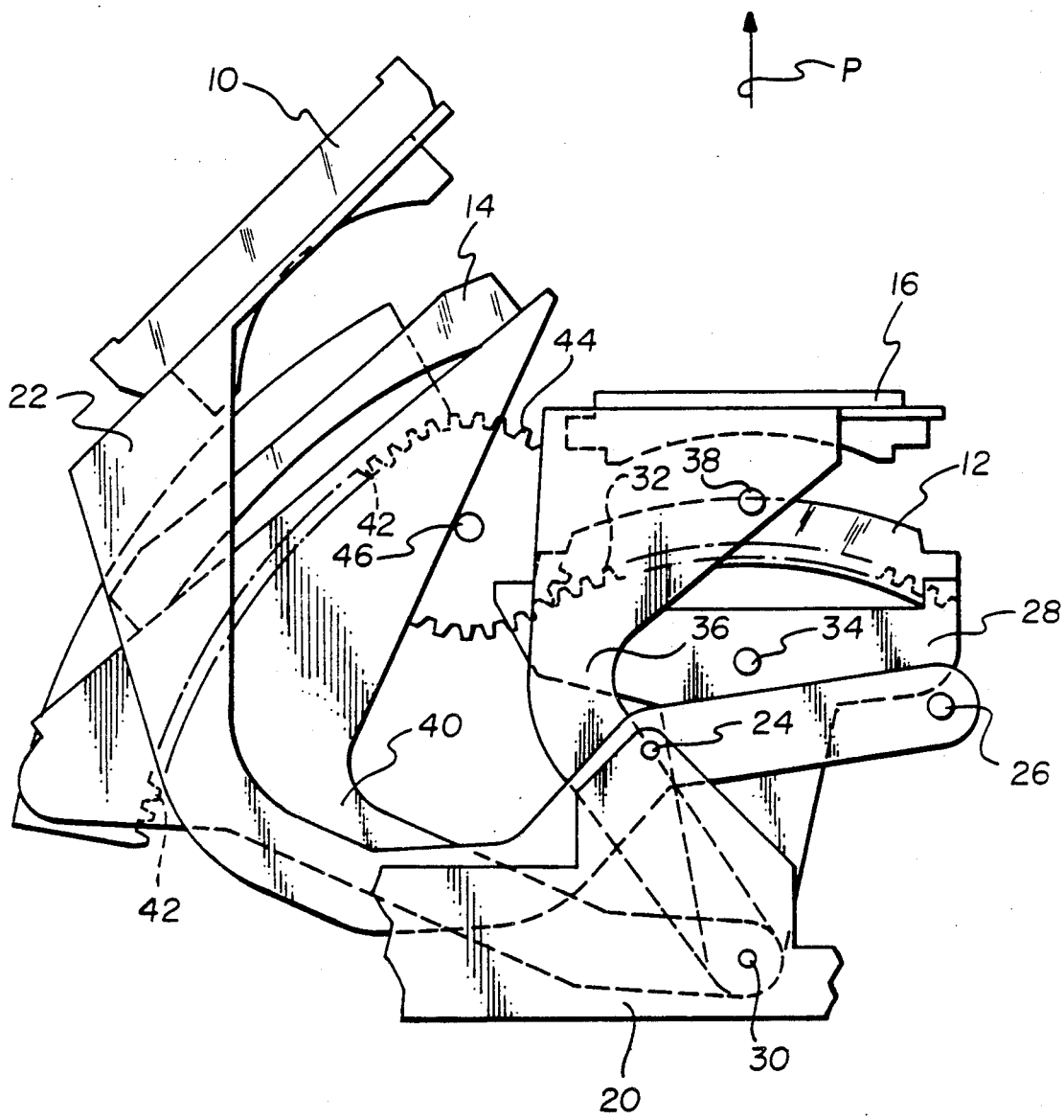
FIGS. 3 and 4 are views similar to FIGS. 1 and 2 showing the parts in a tele viewing position.
Figure 4:
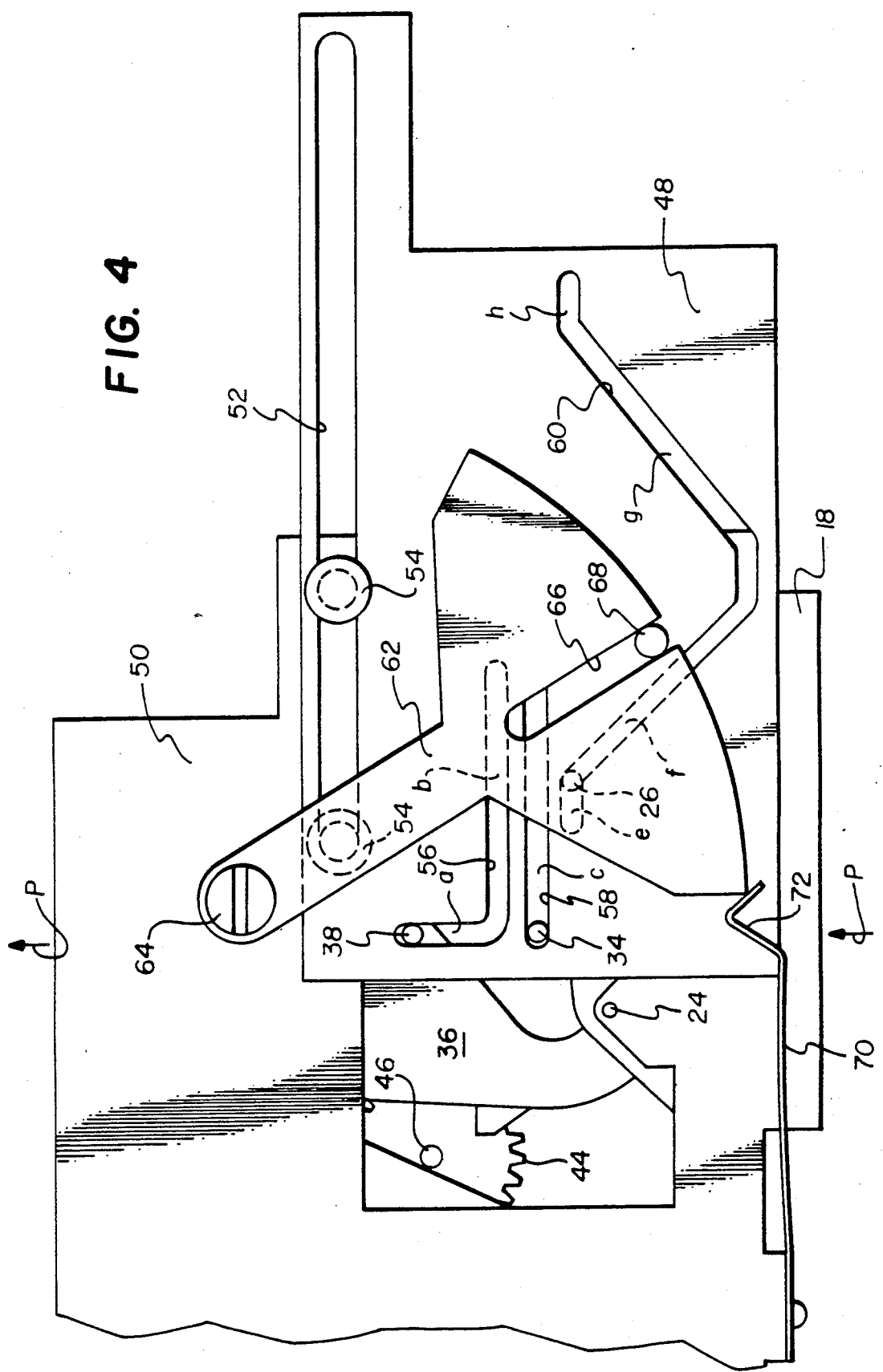
Figure 5:
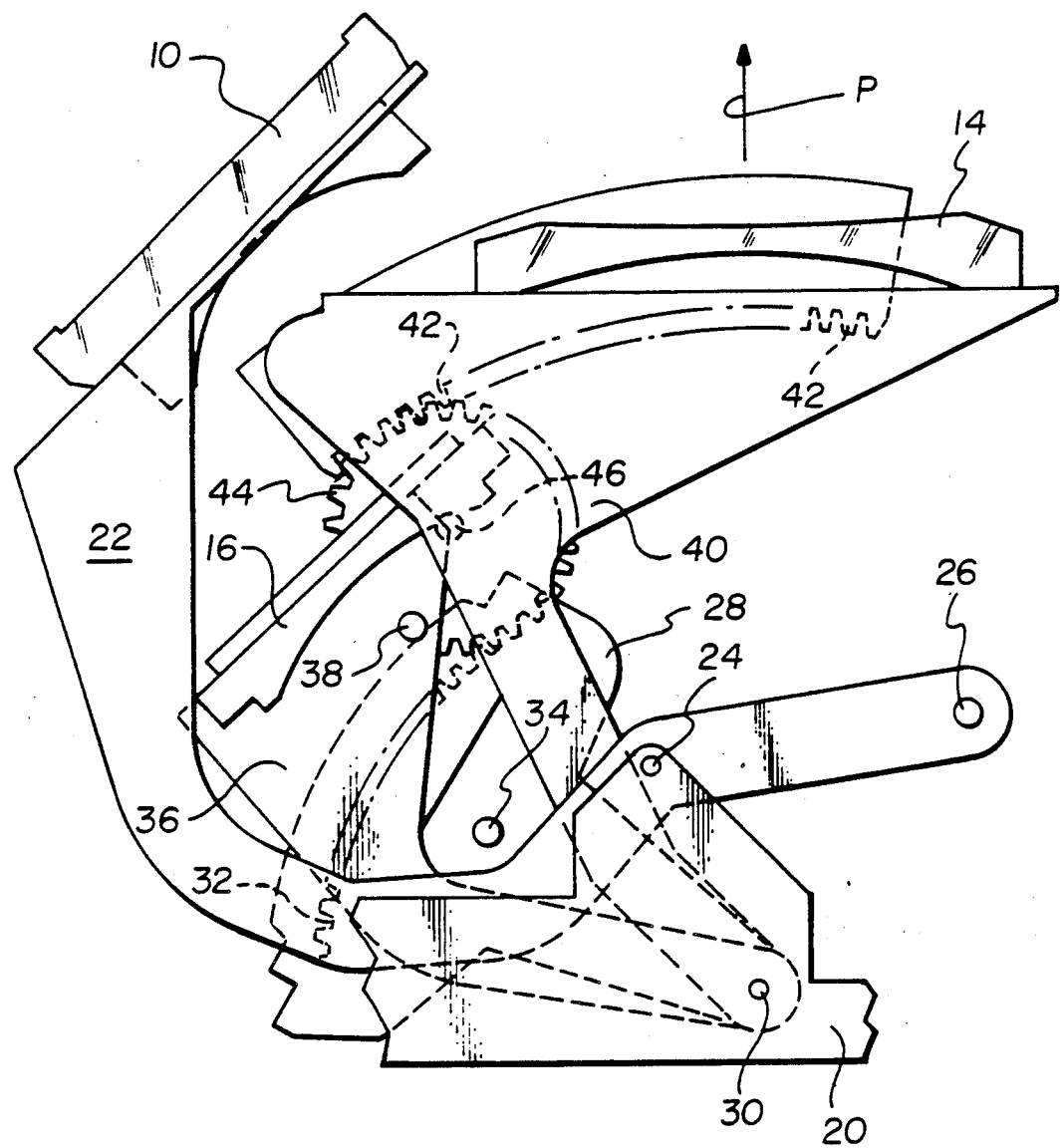
Figure 6:
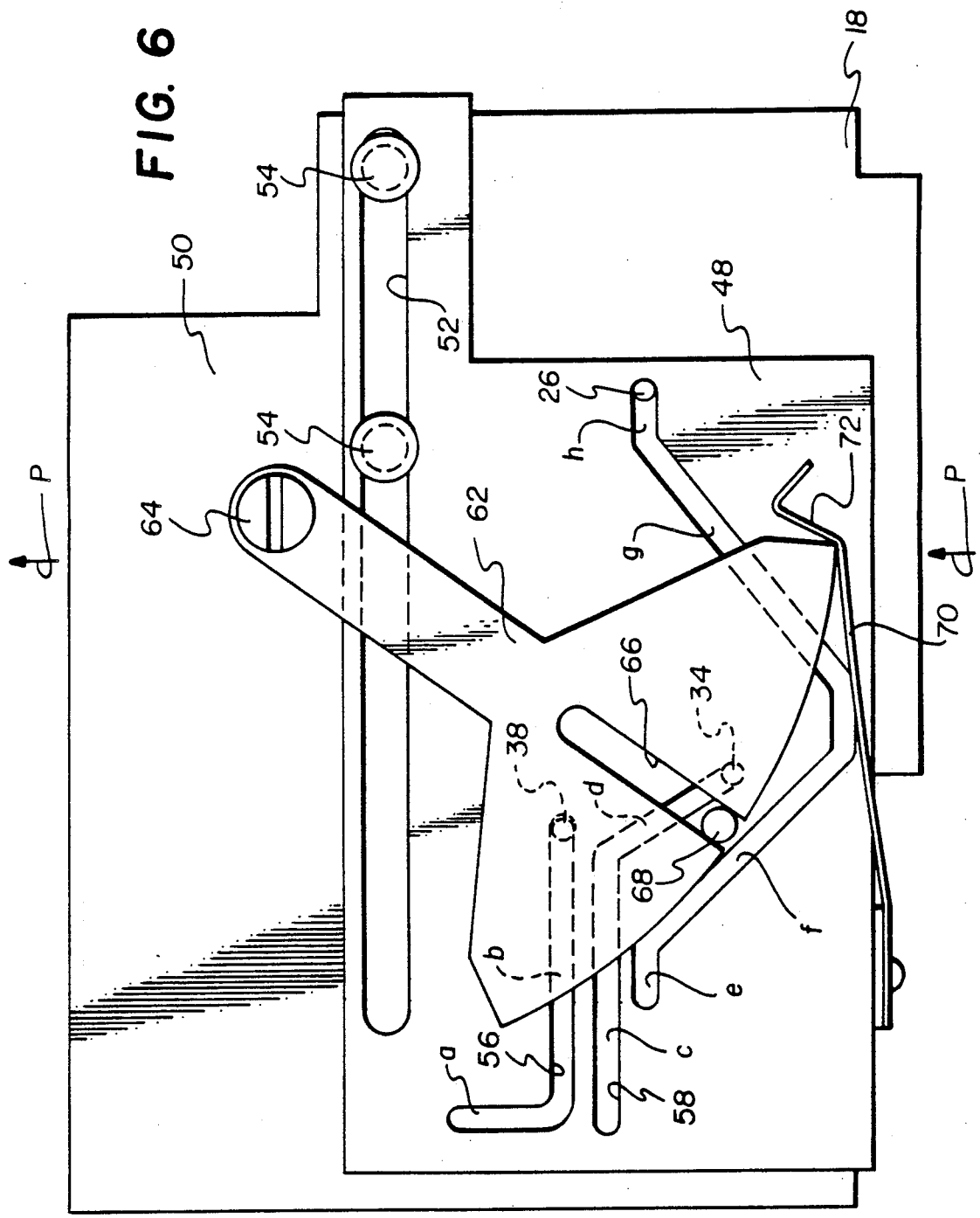

Referring to FIGS. 1 and 2 of the drawings, there is shown a viewfinder device for a photographic camera. To simplify the disclosure, camera parts not necessary for an understanding of the invention have been omitted. For example, the eye lens and front optical element are not shown and the disclosure is limited to apparatus for moving the movable lens elements The viewfinder comprises four movable lens frames 10, 12, 14, and 16 and a fixed frame 18 (FIG. 2). The fixed frame 18 supports a viewing lens. The frames 10 and 12 support lenses which when aligned with the frame 18 in the optical path P as shown in FIGS. 1 and 2 produce a normal image in the viewfinder. Frame 14 supports a lens which when aligned with the lens supported by frame 18 as shown in FIGS. 5 and 6 produces a pseudo panoramic image. Frame 16 supports a lens which when aligned with the frame 18 lens as shown in FIGS. 3 and 4 produces a pseudo tele image.

Referring again to FIGS. 1 and 2, the frames 10, 12, 14, and 16 are carried by arms pivotally mounted on a base plate 20 of a frame 18, only a fragmentary portion of which is shown to facilitate illustrating the details of the movable parts. More specifically, the frame 10 is carried by a generally C-shaped arm 22 which is pivotally mounted on a pin 24 fixed to base plate 20 and provided with a cam pin 26. The frame 12 is carried by an arm 28 which is pivotally mounted on a pin 30. The arm 28 is provided with an arcuate gear rack 32 and a cam pin 34. Frame 16 is carried by an arm 36 which is also pivotally mounted on pin 30 and provided with a cam pin 38. Frame 14 is carried by an arm 40 which is provided with an arcuate gear rack 42. An idler gear or pinion 44 is rotatably mounted on a pin 46 and engages gear racks 32 and 42.

Referring more specifically to FIG. 2, a cam plate 48 is slidably mounted on the upper plate 50 of support structure 21. The plate 48 is provided with an elongated slot 52 which receives two guide screws 54. The guide screws 54 and slot 52 permit rectilinear movement of cam plate 48 to the right and left of its center position shown in FIG. 2 as will be described in more detail below.

The cam plate 48 is provided with an L-shaped cam slot 56 having a cam portion (a) and an idler portion (b), a cam slot 58 having a cam portion (d) and an idler portion (c) angularly oriented with respect to each other, and a cam slot 60 having portions (e), (f), (g), and (h) also angularly oriented with respect to each other. The slots 56, 58 and 60 receive pins 38, 34, and 26 respectively and serve to position their respective frame arms upon displacement of the cam plate 48 as described in more detail below.

A detent means is provided for yieldably retaining the cam plate 48 in its center position shown in FIG. 2. More specifically, a detent arm 62 is pivotally mounted on a screw 64 attached to plate 50 and is provided with a slot 66 which receives a pin 68 fixed to cam plate 48. A leaf spring 70 is provided with a V-shaped bent portion 72 which engages the end of slot 66. Upon displacement of the cam plate 48 to the right or left, the V-shaped portion 72 of spring 70 will be cammed out of the slot 66 by the slot edges and ride on the arcuate surface of arm 62 as shown in FIGS. 4 and 6. However, in the center position of the cam plate 48 shown in FIG. 1 the inherent bias of spring 70 and engagement of V-shaped portion 72 with the end of the slot 66 will resiliently retain the cam plate in the center position.

In operation, the parts described above will be in the positions shown in FIGS. 1 and 2 in the normal viewing mode. More specifically, the frames 10 and 12 will be aligned with the optical axis for normal viewing If it is desired to effect pseudo tele viewing, the cam plate 48 will be displaced to the right to the position shown in FIGS. 3 and 4. Such displacement of the cam plate 48 will cause portion (a) of cam slot 56 to displace cam pin 38 from the position shown in FIG. 2 to the position shown in FIG. 4. Such displacement of the cam pin 38 will pivot arm 36 clockwise about pivot pin 30 to the position shown in FIG. 3 to thus move lens frame 16 into the optical path. Cam pin 26 will be displaced by section (f) of cam slot 60 to pivot arm 22 to the position shown in FIG. 3 to move lens frame 10 out of the optical path. Arm 28 will not be moved because cam pin 34 will move in idler portion (c) of slot 58 and lens frame 12 will remain in the optical path to provide tele viewing Upon movement of the cam plate 48 back to its center position shown in FIGS. 1 and 2, the opposite movements will occur and the parts will assume their original positions shown in FIGS. 1 and 2.

If when the parts are in the normal viewing position shown in FIGS. 1 and 2 it is desired to achieve panoramic viewing, the cam plate 48 will be displaced to the left from the position shown in FIGS. 1 and 2 to the position shown in FIGS. 5 and 6.

During such displacement of the cam plate 48 to the left, pin 34 will be displaced by cam portion (d) of slot 58 to pivot arm 28 counterclockwise about pin 30 to the position shown in FIG. 5. Such pivotal movement of arm 28 will cause rack 32 to rotate pinion 44 clockwise. Such rotation of the pinion 44 will cause rack 42 to pivot arm 40 clockwise to position lens frame 14 into the optical axis. Cam section (g) of cam slot 60 will displace pin 26 to pivot arm 22 counterclockwise, thereby moving frame 10 out of the optical path to the position shown in FIG. 5. Pin 38 will ride in the idler portion (b) of cam slot 56 and no movement of arm 36 will occur. Upon movement of the cam plate 48 back to the normal viewing position, the reverse movements will occur and the parts will reassume the positions shown in FIGS. 1 and 2.

It will thus be apparent that the invention provides a simple, reliable mechanism for positioning a plurality of lens frames to achieve normal, tele, and panoramic viewing. By utilizing a rack and pinion gear means for achieving positive positioning of at least one lens frame, a cam means can be provided with minimum complexity to position at least four lens frames.

The invention has been described in detail with particular reference to a presently preferred embodiment, but it will be understood that variations and modifications can be effected within the spirit and scope of the invention.

I claim:

1. A viewfinder for selectively producing normal, tele, and panoramic viewing in a photographic camera, comprising:

a plurality of lens frames;

a plurality of pivotally mounted arms for supporting said lens frame;

cam means for selectively positioning at least a first two of said arms to position their respective lens frames into a viewing position; and gear means coupling at least a second two of said arms for positioning the lens frame supported by one of said second to arms into a viewing position and simultaneously positioning the lens frame supported by the other of said second two arms out of a viewing position.

2. A viewfinder as claimed in claim 1 wherein said cam means comprises a cam plate slidably mounted on a support structure and having cam slots; and cam pins extending from said first two arms and received by said slots.

3. A viewfinder as claimed in claim 2 wherein said gear means comprises a gear rack on each of said second two arms; and a pinion gear coupling said racks.

4. A viewfinder as claimed in claims 2 or 3 further including a detent means for resiliently retaining said cam plate in a normal viewing position.

5. A view finder as claimed in claim 4 wherein said detent means comprises a pivotal arm having a slot; and spring means engaging said slot in said normal viewing position.

* * * * *